UNITED STATES PATENT OFFICE.

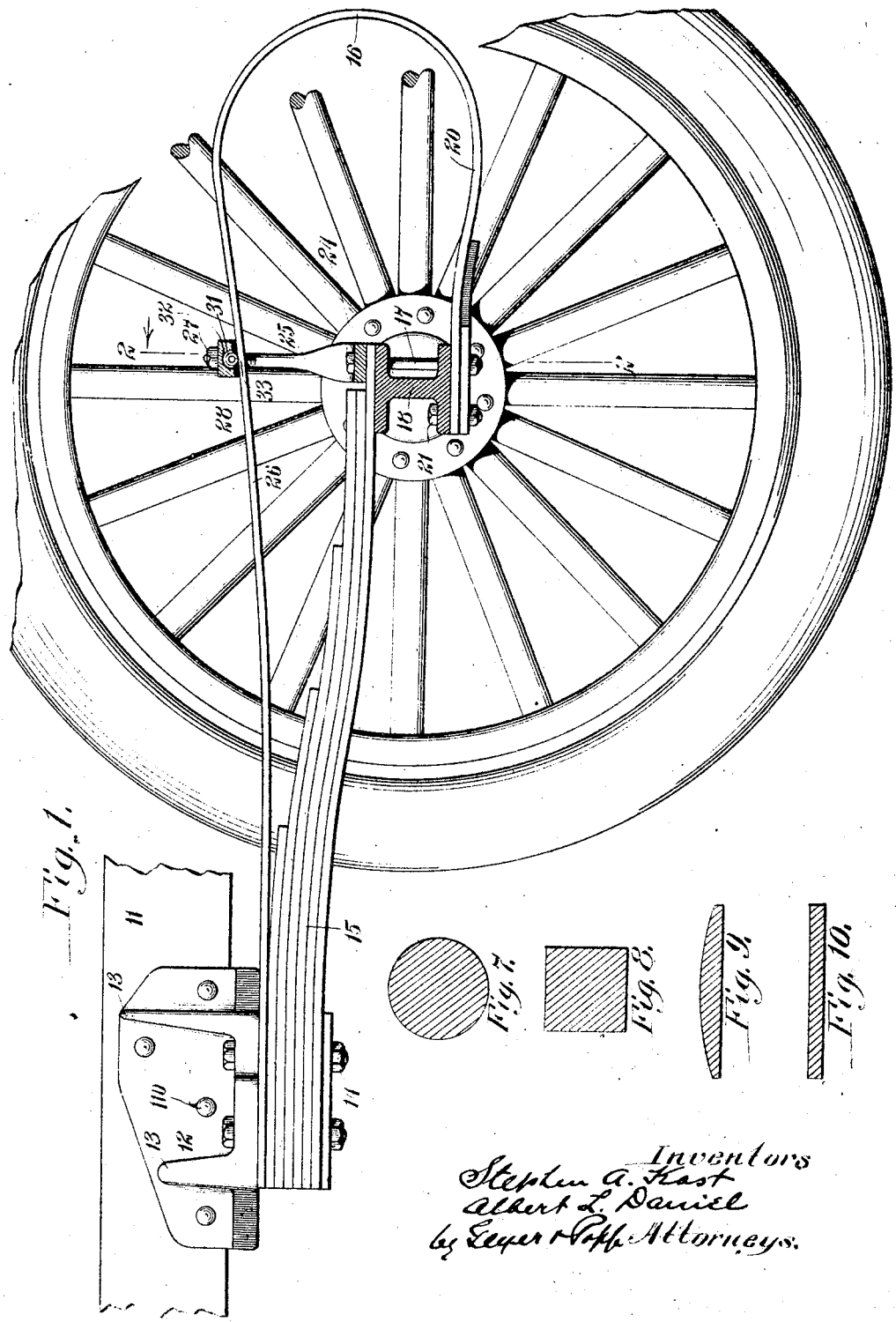

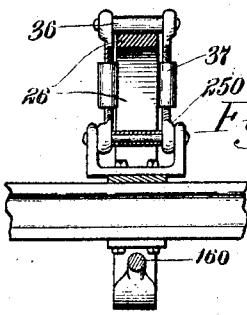
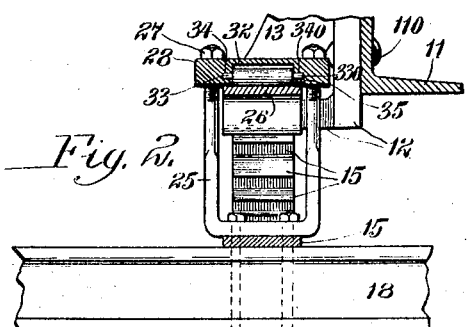
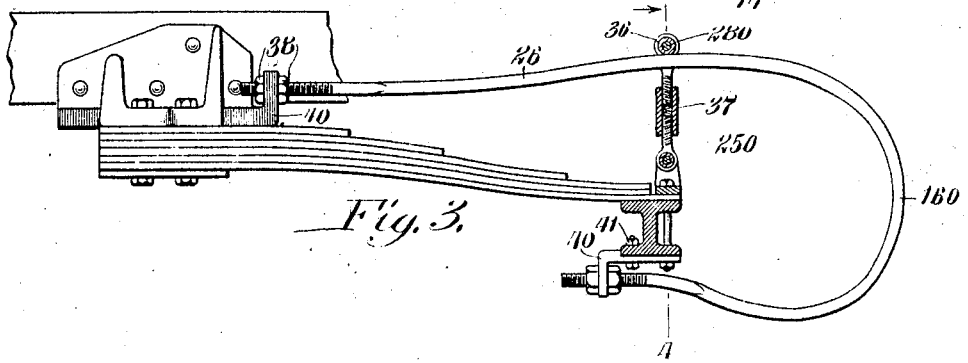
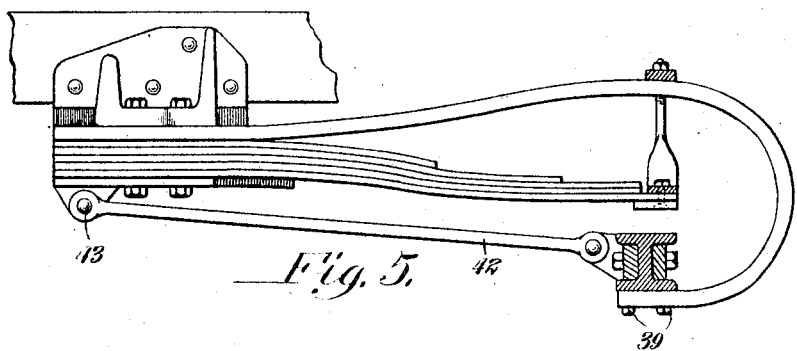
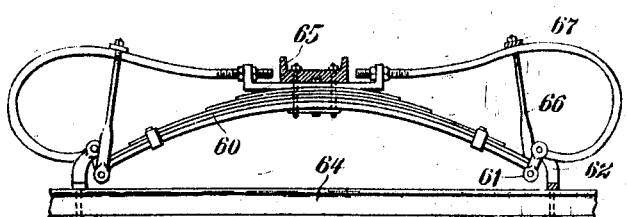

STEPHEN A. KOST AND ALBERT L. DANIEL, OF BUFFALO, NEW YORK.

SPRING AND SHOCK-ABSORBER.

1,380,722.   Specification of Letters Patent.   Patented June 7, 1921.

Application filed September 29, 1919. Serial No. 327,093.

*To all whom it may concern:*

Be it known that we, STEPHEN A. KOST and ALBERT L. DANIEL, citizens of the United States, and residents of Buffalo, in the county of Erie and State of New York, have invented new and useful Improvements in Springs and Shock-Absorbers, of which the following is a specification.

This invention relates to a vehicle spring and shock absorber for relieving the frame of the vehicle of undue vibration and shocks, as the vehicle travels over holes and rough places in the road.

The object of the invention is to practically lift the wheels of the vehicle over rough spots in the road and to resiliently cushion the return of these springs to their normal position after they have been flexed, thereby softening the reaction in sudden rebounds. A further object of the invention is to provide an improved spring and shock absorber combined in one simple spring suspension which will distribute the weight toward the center of the car, whereby the twisting strains on the frame of the car due to spring action, is substantially eliminated, accomplishing practically the same result as the well recognized three point suspension. A further object of the invention is to successively bring a number of increasingly strong spring pressures into action as the pressure against the vehicle axle is increased. A further object of the invention is to provide a spring suspension which may be adjusted within a wide latitude and which may be readily and quickly applied to the cars which are now in use, without the need of any special tools or appliances.

In the accompanying figures;

Figure 1 is a fragmentary, vertical, longitudinal section through the vehicle showing our improved spring and shock absorber as applied thereto. Fig. 2 is a vertical transverse section thereof taken on line 2—2 Fig. 1. Fig. 3 is a fragmentary vertical longitudinal section through the vehicle showing a modified form of spring and shock absorber. Fig. 4 is a vertical transverse section thereof taken on line 4—4 Fig. 3. Figs. 5 and 6 are fragmentary vertical sections through the vehicle showing other forms of our improved spring and shock absorber. Figs. 7, 8, 9 and 10 are vertical transverse sections through the secondary spring showing various modified cross-sectional shapes which may be employed therefor.

Similar characters of reference indicate like parts throughout the several views.

Referring to Fig. 1, 11 represents one of the main longitudinal frame bars of the vehicle to which the body of said vehicle is connected in the usual and well known manner. Secured to the frame by means of rivets 110 or otherwise is a laterally projecting bracket 12 which may be provided with suitable stiffening ribs 13. Clamped against the lower face of said bracket 12 by means of bolts 14 is an outward extending primary spring 15 which preferably consists of a number of spring leaves of different length, as is illustrated. Between the upper face of said primary spring and the lower face of said bracket 12 is clamped a U shaped secondary spring 16, which projects outwardly from said bracket and is arranged in line with and just above the primary spring.

The outer end of the primary spring rests upon and is secured by bolts 17 or otherwise to the axle 18 of the vehicle, while the lower or return-bend arm 20 of the secondary spring is secured by bolts 21 and the aforesaid bolts 17 to the lower face of said vehicle axle. The forward vertical bolt 17 passes entirely through the flanges of the vehicle axle and is arranged to secure thereto at its upper end a vertically disposed U shaped tie yoke 24 as best shown in Fig. 2. The two arms 25 of the tie yoke are positioned transversely with respect to each other and extend upwardly on either side of the upper arm 26 of the secondary spring. The upper ends of the yoke arms 25 are rounded and are provided with suitable threads to engage with the threaded bores of two adjusting nuts 27. These adjusting nuts are screwed down against the upper face of a transversely disposed presser plate 28, which is provided with suitable holes 19 which loosely receive the vertical arms 25 of the yoke 24 and are thereby free to slide up or down on said yoke. The under face of said presser plate 28 is adapted to press downwardly against, but is in no way secured to, the upper face of the arm 26 of the secondary spring.

By screwing down the adjusting nuts 27, a pressure or flexure is created in the secondary spring 16 and, at the same time, a pressure or flexure is created in the combined leaves of the primary spring 15 by reason of the yoke connection between the two springs. When this combination of springs receives a common pressure movement, the amount of flexure or combined spring movement is not directly proportional to the pressure exerted against both of them, as would be the case with an ordinary simple spring whose stress would be directly proportional to the strain thereon. With this improved spring and shock absorber, the pressure reaction remains substantially constant throughout a considerable distance, that is, until the upper or secondary spring 16 ceases to exert an upward pressure. This is due to the fact that as fast as an increased pressure is built up in the primary spring, just so fast, or approximately so, is the secondary spring decreasing the resilient pressure which it exerts.

One or more hardened rollers 31 may be inserted between the primary spring and the presser bar, said roller being received in a transversely arranged groove or pocket 32 which is formed in the lower face of the pressure plate 28. One end of the roller is provided with a reduced shank or stud 33, which is provided with a suitable bearing hole 34 arranged transversely in the presser bar and extending outwardly and horizontally from the groove 32. The other end of the roller is provided with a stud or reduced end 330 which is arranged to be received by a transverse notch 340 which opens downwardly and which extends horizontally outwardly from the groove 32. To prevent the roller from disengaging from the presser bar, the same is provided with a transversely movable retaining plate 35 which engages with suitable slots in the notch 340 and is adapted to bear against the lower face of the stud 330.

Where greater refinement of spring action is desired and where the cost is not the determining factor, a form of spring such as is shown in Figs. 3 and 4 is preferred. In this modification the transverse presser bar 280 is round in cross section and acts as a bearing surface for a tubular anti-friction sleeve 36, which is free to slide or roll back and forth on the upper surface of the arm 26 of the secondary spring and can lift up above said spring with impunity. So as to deaden the noise which may result when this roller sleeve 36 comes in quick contact with the upper face of the secondary spring, said roller is preferably composed of pressed fiber, lignumvitæ or the like, but even ordinary soft rubber is satisfactory by reason of the very small lateral motion of the presser bar relatively to the secondary spring with which it engages. In the construction shown in Figs. 3 and 4, the vertical adjustment of the roller is accomplished by providing the two yoke arms 250 with suitable turn buckles 37, which are provided with suitable right and left internal threads, so that, by turning the same in one direction or the other, the roller sleeve 36 may be adjustably moved up or down correspondingly and the tension on the primary and the secondary springs thereby altered. The secondary spring 160 shown in Figs. 3 and 4, is rectangular in cross section but, for purposes of adjustment, the ends of said spring are rounded and suitably provided with screw threads which are engaged by adjusting nuts 38. The rear end of the upper arm of the secondary spring 160 passes loosely through a suitable longitudinal hole formed in an upwardly extending flange 40 which is integrally formed at the outer end of the bracket 12. By loosening one of said adjusting nuts 38 and screwing up its companion nut, the corresponding end of the secondary spring may be moved either forwardly or backwardly and a suitable adjustment thereby effected, this secondary spring acting similarly to the bow with which the Indians shoot their arrows. The inner end of the lower, or return-bend arm of the spring is similarly rendered capable of adjustment, the same passing through a loose hole in an axle bracket 40, which is secured to the lower face of the vehicle by means of bolts 41 or otherwise, as may be desired for any particular application to a spring suspension already in use.

A further modification is shown in Fig. 5 which is more particularly applicable to very light vehicles such as automobile runabouts. Here the inner ends of both the primary and secondary springs are secured as in Fig. 1 and the upper arm of the secondary spring is connected, at outer end, by means of an adjustable yoke and presser bar to the outer end of the primary spring as in the previous construction. The vehicle axle however is not connected to the primary spring, but, on the contrary, this axle is connected to only the lower arm of the secondary spring, by means of the bolts 39 or otherwise. In this construction it is preferred that the axle be prevented from unduly moving backwardly, by means of a radius rod 42, whose rear end is suitably pivoted at 43 to the frame of the vehicle in the usual and well known manner. In this construction the ordinary or light loads to which the springs are subjected are carried principally by the flexible, resilient, return-bend of the secondary spring. When heavier pressures are exerted on the axle, as when the wheel of the car passes over a hole or rough place in the road the axle comes in direct contact with the lower face of the primary spring at the outer end thereof, so that any further increase of pressure moves the two springs, precisely as in the case of the previously described constructions, the resisting pressure being substantially constant throughout a certain distance; that is, so long as the pressure bar is in contact with the upper arm of the secondary spring. After the presser bar has lifted up above the secondary spring, any still heavier pressures are resisted by both springs acting in unison in the same direction.

A further modification of our improved spring and shock absorber is shown in Fig. 6, whereby the same is made applicable to either the front or rear springs of a certain very well known make of automobile. In this construction the opposite ends of the primary spring 60 are pivotally connected to the lower ends of links 61. The upper ends of these links are pivoted to the upper end of brackets 62 which are in turn secured by bolts 63 to the axle 64 of the vehicle. The inner end of each secondary spring is solidly secured to the frame 65 of the vehicle similarly to Fig. 3, while the inner end of the lower arm of each secondary spring is connected, pivotally or otherwise, to the bracket 62. The outer end of the primary spring is connected to the upper arm of the secondary spring by means of an upwardly extending yoke 66 and a transversely disposed presser bar 67 similarly to previous constructions, the principle of action being substantially similar.

This improved spring and shock absorber, as will now be evident, practically lifts and helps the wheels of the vehicle over holes and rough places in the roads. The secondary springs in each of the constructions so act in conjunction with their companion primary springs that the latter are aided in their load flexure and are also resiliently prevented from returning to their normal position with too great violence. By reason of the fact that both the primary and secondary springs are connected considerably inwardly of the axle of the car, the warping or twisting strains on the frame of the car are practically eliminated and the flexible motion of the whole car, as it travels along, greatly increased. The entire spring construction may be constructed of standard stock by the ordinary machinery in the shop and is sturdy in construction, simple in its action, graceful in appearance, and is soft in its spring action both upwardly and downwardly. The spring may be applied to cars as now in use and the parts thereof may be constructed, as shown in Figs. 7, 8, 9 and 10, to suit the particular requirements of any certain kind of car. The object of this invention is to bring a tension on the secondary spring and shock absorber by means of the yoke 24 whose lower end is secured to the axle and the pressure which is applied thereby lessens the pressure on the vehicle wheel and directs the weight toward the center of the car where this spring is connected to the frame of the car, thereby lessening and absorbing the shocks.

We claim as our invention:

1. A resilient support and shock absorber for vehicles comprising a primary spring connected at one end with the body, a secondary spring connected at its opposite ends respectively to the vehicle axle and to the body of the vehicle at the same point at which said primary spring is connected, and a yoke connecting the opposite end of the primary spring with the secondary spring intermediate of the ends of the latter.

2. A spring and shock absorber comprising a longitudinal primary spring; a longitudinally arranged U shaped secondary spring whose opposite arms are arranged above and below said primary spring; an axle secured to the lower arm of said secondary spring; a yoke connected to said primary spring and extending upwardly; and a presser bar arranged to bear downwardly against said secondary spring and adjustably connected with said yoke.

3. A vehicle spring and shock absorber comprising a vehicle frame; a primary spring; a U shaped secondary spring secured to said frame; a vehicle axle connected to the lower arm of said secondary spring; a yoke connected at its lower end to said primary spring and provided with a presser bar adapted to normally and adjustably bear downwardly against the upper arm of said secondary spring; and means for longitudinally adjusting either the upper or the lower arms of said secondary spring.

4. The spring and shock absorber comprising a primary spring; a yoke connected to the outer end thereof; a vehicle axle; a U shaped secondary spring whose lower arm is connected to said vehicle axle and its upper end connected to the inner end of said primary spring; and a roller arranged in the upper part of said yoke and arranged to normally and adjustably bear downwardly on the upper arm of said secondary spring.

STEPHEN A. KOST.
ALBERT L. DANIEL.